United States Patent [19]

Ohara et al.

[11] Patent Number: 5,053,798
[45] Date of Patent: Oct. 1, 1991

[54] AUTOMATIC FOCUSING DEVICE

[75] Inventors: Tsunemasa Ohara, Tokyo; Tatsuo Chigira; Tsunefumi Tanaka, both of Kanagawa, all of Japan

[73] Assignee: Canon Kabushiki Kaisha, Tokyo, Japan

[21] Appl. No.: 398,332

[22] Filed: Aug. 28, 1989

Related U.S. Application Data

[63] Continuation of Ser. No. 143,051, Jan. 12, 1988, abandoned.

[30] Foreign Application Priority Data

Jan. 14, 1987 [JP] Japan .................................. 62-6346

[51] Int. Cl.$^5$ ............................................. G03B 13/36
[52] U.S. Cl. ...................................... 354/400; 354/286
[58] Field of Search ..................... 354/400, 402, 195.1, 354/195.12, 286

[56] References Cited

U.S. PATENT DOCUMENTS

| | | | |
|---|---|---|---|
| 4,477,164 | 10/1984 | Nakai et al. | 354/286 |
| 4,483,603 | 11/1984 | Metabi et al. | 354/286 |
| 4,518,239 | 5/1985 | Tomori | 354/286 |
| 4,548,488 | 10/1985 | Honda et al. | 354/286 |
| 4,572,638 | 2/1986 | Nakai et al. | 354/286 |
| 4,673,275 | 6/1987 | Nakai et al. | 354/286 |
| 4,728,980 | 3/1988 | Nakamura et al. | 354/286 |
| 4,733,258 | 3/1988 | Kojima | 354/286 |
| 4,737,812 | 4/1988 | Hasegawa et al. | 354/286 |
| 4,772,909 | 9/1988 | Ogasawara | 354/400 |

Primary Examiner—Russell E. Adams
Attorney, Agent, or Firm—Fitzpatrick, Cella, Harper & Scinto

[57] ABSTRACT

An automatic focusing device for performing focus detection through an objective optical system, and adjusting the focusing position of the objective optical system in accordance with the detection result, wherein the attachment or detachment of an optical element for changing the focal length of the objective optical system is detected, and the speed of the drive source is changed depending on the detection result.

10 Claims, 13 Drawing Sheets

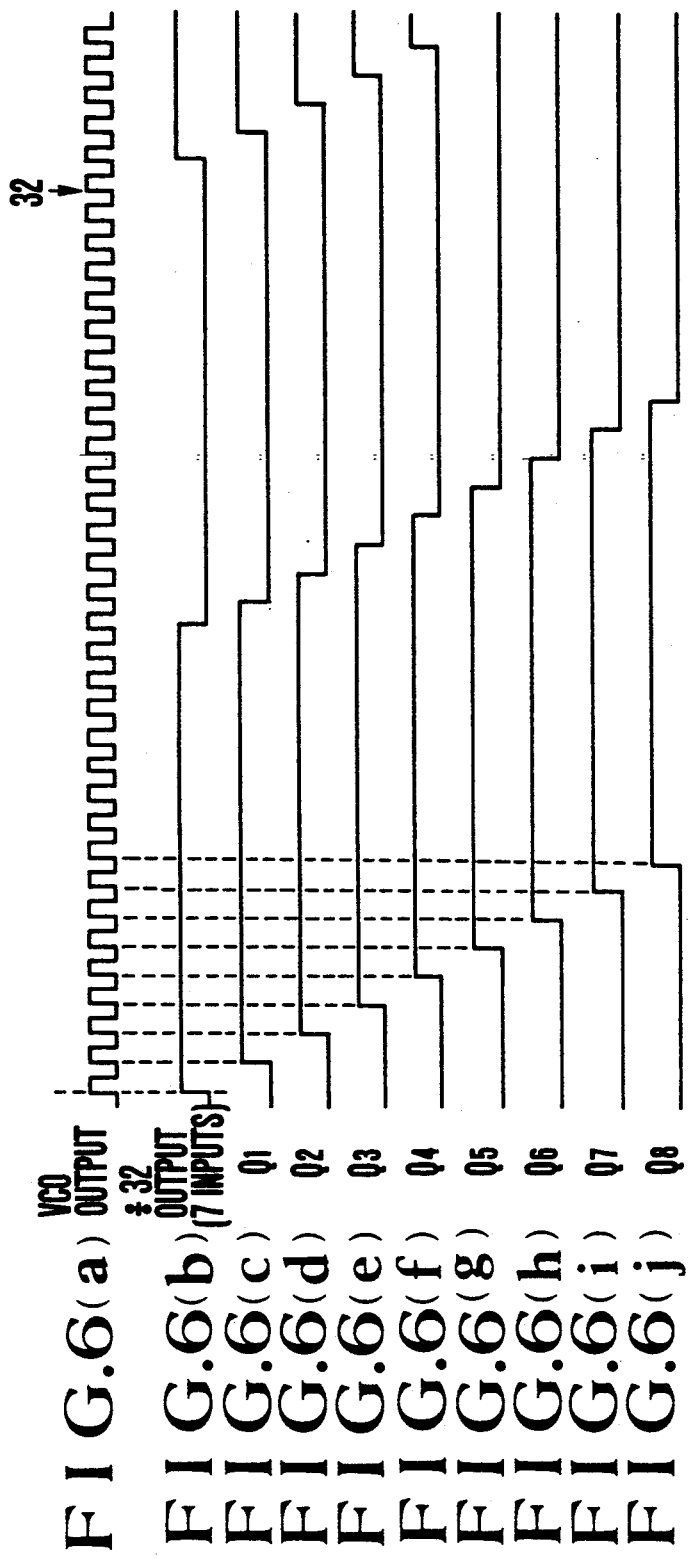
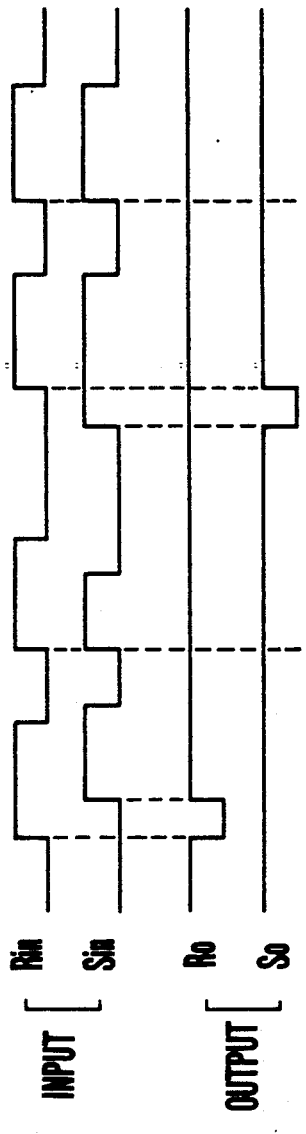

AUTOMATIC FOCUSING DEVICE

This application is a continuation of application Ser. No. 143,051, filed Jan. 12, 1988, now abandoned.

BACKGROUND OF THE INVENTION:

1. Field of the Invention

This invention relates to devices for automatically focusing an objective optical system by detecting its focus state on an object and, more particularly, to photographic apparatus or observation apparatus having an optical element releasably attached in the optical path of an objective optical system to change the focal length of the objective optical system with a change of the speed of focus adjustment suited to the timing of focus detection.

2. Description of the Related Art

Recently, the automatic focus adjustment has experienced to wide use in single lens reflex cameras. Compared with the lens-shutter camera with auto-focus capability, a far higher accuracy of focus adjustment is demanded for the single lens reflex camera. Hence, in most cases, the image sharpness is detected repeatedly in certain time intervals during the focusing movement of the photographic lens, and the adjusted amount of movement of the lens is corrected based on the result of the recycled detection.

The recycle period depends mainly on the time during which the detection result is reached, specifically speaking, the sum of the information integration time of the detection sensor, the computing time of the sensor signal and the time of discriminating between the in-focus and out-of-focus states, determining the defocus direction and calculating the amount of defocus. The computing and signal processing time is almost constant for the constant brightness of the object. When, for example, $EV=11$, it takes about 140 ms.

Meanwhile, of known focus detecting methods, even the one employing the phase difference measuring (correlation) technique has a facility of detecting the defocus amount virtually limited at the upper side, though differing with different types of the detection system, ranging from 10 to 30 m/m. To allow for larger defocus amounts, therefore, a process must be provided in which the measurement is recycled a number of times to approach the true value.

With this, it is of great importance that the speed of focus adjustment be suited to the timing of repetition of the focus detection. If the speed of focus adjustment is too fast, the object image plane of sharp focus will overrun past a prescribed focal plane during the time between the previous and present cycles of detection. In this case, the photographic lens after having once been moved forward has to be returned backward. In fact, it takes a longer time for the lens to reach the in-focus position.

By the way, one of the merits of the single lens reflex camera is in using a wide variety of interchangeable lenses of different focal length selectively. Aside from these lenses, each complete in itself, attachment lenses are also used in combination with an interchangeable lens, including extenders for enlarging the focal length of the master or interchangeable lens, reducers for contracting the focal length of the basic or interchangeable lens, and closeup lenses for shortening the minimum object distance. For telephoto photography, the extender is often used. But the combined lens, though being driven to move at the same apparent speed, gives rise to a phenomenon that the distance the sharp image plane moves in one cycle of detection is increased by about the square of the rate of enlargement of the focal length even at a minimum or when the given detected position is close to the in-focus position.

Therefore, determination of the speed of focusing movement of the lens must be made in such a way that the focus detection device can sufficiently cope with it not only when the lens is used in itself, but also when in combination with the extender. If the speed when in use with the extender is taken for granted, a far greater proportion of photographic situations (than those which necessitate the use of extenders) are inconvenient because the speed of focus adjustment is unduly slow. Particularly, telephoto lenses are apt to increase the defocus amount. From the standpoint of good manageability, therefore, there has been a demand for increasing the speed of focusing movement of the lens as far as possible. For this reason, if the speed is taken at too slow a value, an unsatisfactory performance results with a view to the auto-focus camera.

When the reducer is used, on the other hand, for the constant apparent speed of focusing movement of the lens, the actual defocusing speed of the object image is slowed down by the square of the rate of contraction of the focal length. Therefore, ample room is created for a further minimization of the period of each cycle of operation of the focus detecting device. Of course, the original length of the period is acceptable. Yet, there is much room for improvement of the manageability of the camera. Also when in use with the closeup lens, the same holds. Note that techniques close to the foregoing are disclosed in U.S. patent applications Ser. Nos. 688,355, 829,792 and 913,343.

SUMMARY OF THE INVENTION

An object of the invention is to perform focus adjustment at an optimum speed regardless of changes of the focal length of the objective optical system by selectively attaching or detaching optical elements to and from it.

A concomitant object of the invention is to provide a device for focus adjustment of an objective optical system in response to detection of the focus state through the objective optical system, wherein the speed of focus adjustment is altered in automatic response to attachment or detachment of an optical element for changing the focal length of the objective optical system.

BRIEF DESCRIPTION OF THE DRAWINGS

FIGS. 6(a) to 6(j) are pulse timing charts illustrating a manner in which the shift register circuit operates.

FIG. 7 is a timing diagram for the operation of the phase circuit.

DETAILED DESCRIPTION OF THE PREFERRED EMBODIMENTS

Figure 1A:
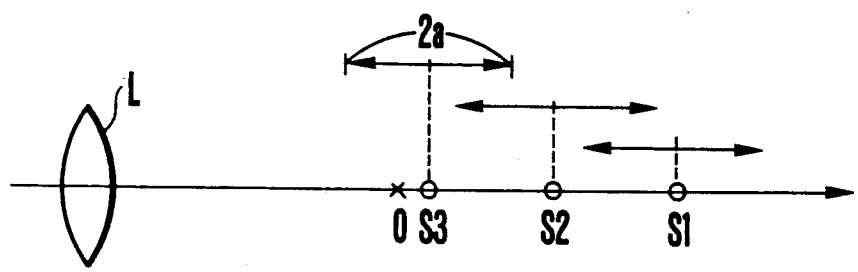
FIGS. 1(a)–1(c) are diagrams taken to explain what a change occurs in the distance the sharp image plane moves in constant cycles of focus detection when the focal length of the objective changes.
Figure 1B:
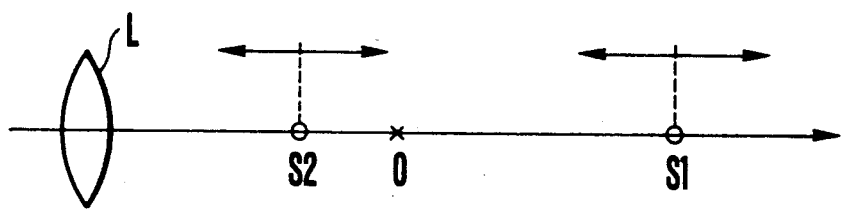
Figure 1C:
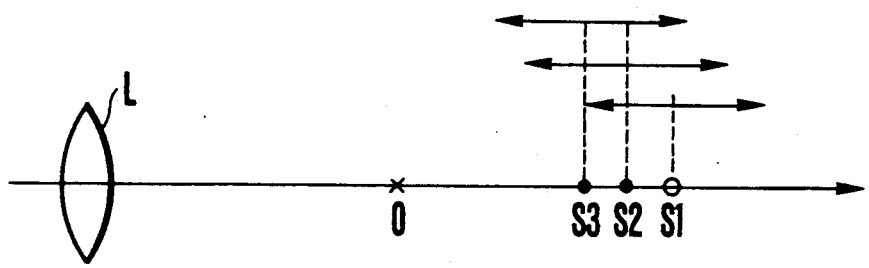

Using FIGS. 1(a)–1(c), the relationship between the recycle of focus detection and the speed of focus adjustment is first explained. In each of these diagrams, the abscissa is in the defocus amount with an original point O at the primary or secondary focal point of an objective lens L. The focus detection sensor used is assumed to have a dynamic range of $\pm a$ in defocus amount.

S1 is a defocus amount when the first cycle of detection is performed. S2 is another defocus amount when in the second cycle. S3 is another defocus amount when in the third cycle. The focus-detectable range of depths is $S1 \pm a$ for the first cycle of detection, $S2 \pm a$ for the second cycle, or $S3 \pm a$ for the third cycle.

Now assuming that as the detection is recycled the successive two of the ranges partly overlap each other as shown in FIG. 1(a), then the sharp focus can eventually be detected in a number of cycles of detection. But, if, as the focus adjusting speed is too fast, there is no overlay between the successive two ranges as shown in FIG. 1(b), the focal plane is caused to fall in the dead space between the previous detecting range and the present detecting range. Hence there are occasions where the sharp focus cannot be detected.

So, in the case of, for example, the helicoid type operating mechanism for the focusing lens member, for such a problem to be averted, one method is to set forth the following rule of design:

$$N \leq a/(\alpha \cdot S \cdot t)$$

where N is the number of revolutions of the helicoid per unit time, $\alpha$ is a constant depending on the pitch of the helicoid for converting rotation to axial movement, a is one half of the detecting depth width, t is the time interval of recycle of detection, and S is the optical responsiveness representing the relationship between the amount of focusing movement of the lens and the amount of axial shift of the sharp image plane.

When the overlap of the successive two ranges becomes large, however, not only the necessary number of cycles of detection increases as a matter of course, but also the focusing time is prolonged to deteriorate. It is, therefore, preferred that, while satisfying the above-defined condition, the overlap is as far reduced as possible. When $N = a/(\alpha \cdot S \cdot t)$, a good efficiency is attained.

Meanwhile, when an attachment optical system of C times magnification is attached to the master lens system, the responsiveness of the composite optical system becomes $C^2$ times higher. In this embodiment, the motor for rotating the helicoid is controlled to a constant speed, whereby the constant speed is made to change between two preset values in response to a signal from means for discriminating that the attachment optical system is in use, or means for discriminating that it is out of use. The required value of the number of revolutions for the use of the attachment optical system is determined to be equal to $1/C^2$ of the preset value of that for the non-use of it.

Figure 2:
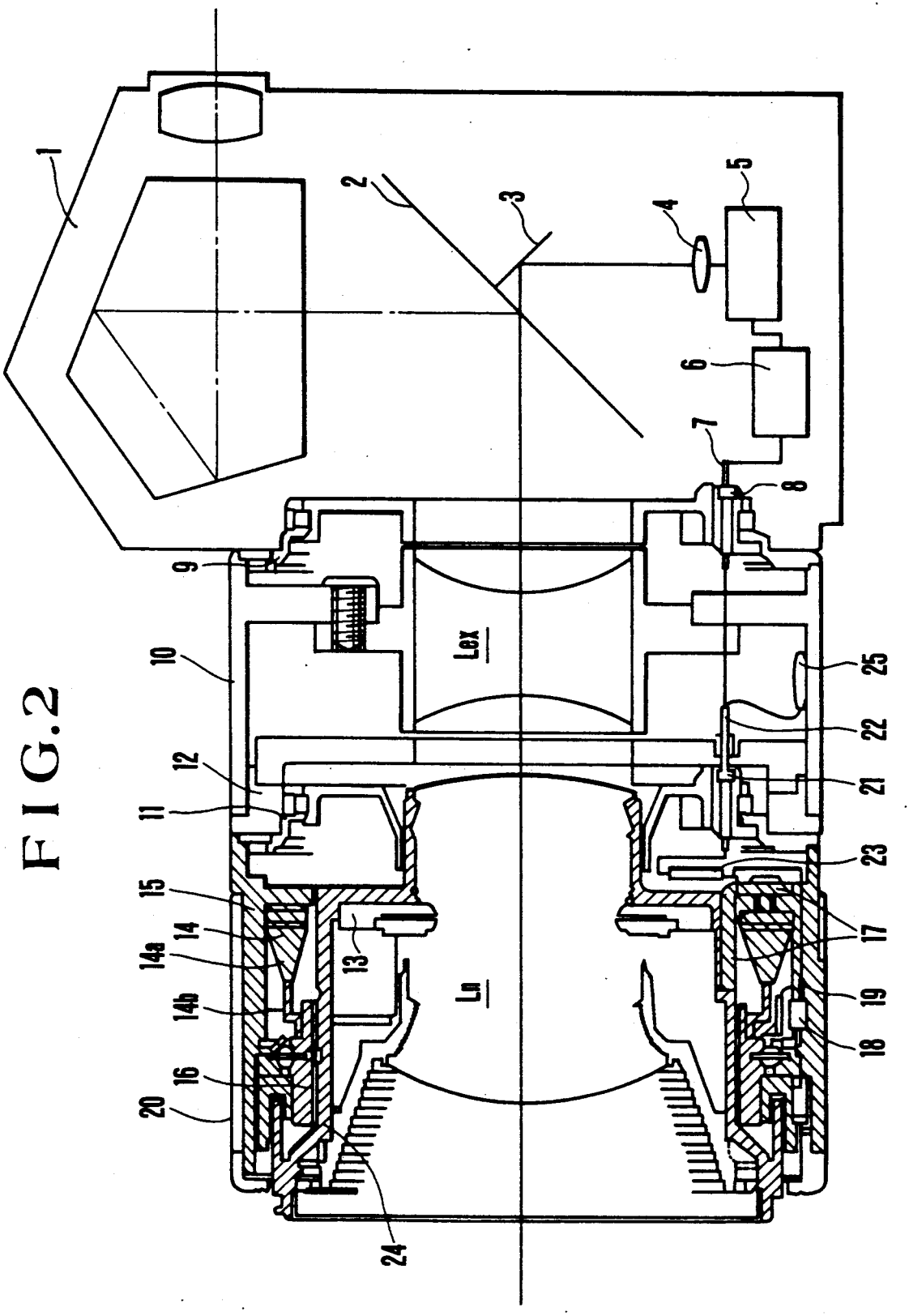
FIG. 2 is a longitudinal section view of a single lens reflex camera employing one form of the invention.

FIG. 2 shows an embodiment of the invention. A camera body 1 is attached to an extender barrel 10 and a photographic lens barrel 20 in this order. The extender barrel 10 contains an extending lens Lex of prescribed magnification C, for example, 2x magnification and the photographic lens barrel 20 contains a photographic lens Ln. The extending lens Lex is so attached in the optical path of the photographic lens Ln. Note that, instead of the extender, a reducer having a reducing power may be attached likewise. Each lens, though depicted as one block for the purpose of convenience, is usually constructed from a number of lens elements. In the interior of the camera body 1, 2 denotes a quick return mirror. The reflected light therefrom is directed to a view finder, and a light beam passing therethrough is reflected by a sub-mirror 3 to reach a focus detecting unit 5 including a field lens 4. The focus detecting unit 5, though not fully described as it is well known in the art, may be of the structure in Japanese Laid-Open Patent Application No. Sho 61-22316 where a photoelectric transducer element is positioned close to the primary focal plane, or in Japanese Laid-Open Patent Application No. Sho 57-23911 where two photo-electric transducer elements are arranged on either side of the primary focal plane at equivalent positions to each other. A signal processing circuit 6 is receptive of the output signal of the focus detecting unit 5 for computing the degree of image sharpness and, when not in focus, determining the direction in which the focusing lens member is moved to bring the image into sharp focus.

Next, the coupling mechanism of the camera is described. A bayonent mount on the front panel of the camera body 1 is assumed to be of the female type, and, when coupled with a male type bayonet mount on the rear end of the extender barrel 10, both are unified to each other. An electrical contact pin 7 is mounted in a contact socket 8 on the extender barrel 10. Though shown only one in number in the figure, a number of pins 7 are used in actual practice and are arranged side by side in a direction perpendicular to the paper. At the front end of the extender barrel 10 there is a female bayonet mount 12 which is coupled with a male bayonent mount 11 of the photographic lens barrel 20 to steadily hold the photographic lens barrel 20. 21 is an electrical contact socket on the photographic lens barrel 20. 22 is an electrical contact pin in the extender barrel 10. Each of these members is plural in number and arranged side by side in a direction perpendicular to the paper.

The photographic lens barrel 20 has an ultrasonic motor 14 of the type built-into the interior thereof. A stator portion 14a of electrostrictive metal formed in a ring like shape with a triangular cross-section is fixedly secured to a main body 15 of the lens barrel 20. The lens barrel 20 has a focusing mechanism of known construction comprising an axially movable helicoid 24, a rotatable helicoid 16, and a key 17 fixedly mounted on the lens barrel body 15 and fitted in a key groove provided in the axially movable helicoid 24. A ring-shaped rotor 14b of the ultrasonic motor 14 is fixedly secured to the rotatable helicoid 16. Also, the rotatable helicoid 16 fixedly carries a pulse plate 19 of curved form having white and black stripes for detecting the amount of rotation of the rotatable helicoid 16. Also mounted on the lens barrel body 15 at an opposite position to the pulse plate 19 is a photo-reflector 18 along with a light emitting element and a photo-transistor oriented to the pulse plate 19 in order to detect the rotation of the pulse plate 19 in the form of an electrical signal.

Each of the signal contact pins 21 is connected to an electrical circuit 23 to be fully described later incorporated in the barrel 20, and the electrical circuit 23 is connected to the ultrasonic motor 14 and an electromagnetic driver for a diaphragm 13 of known construction.

Figure 3:
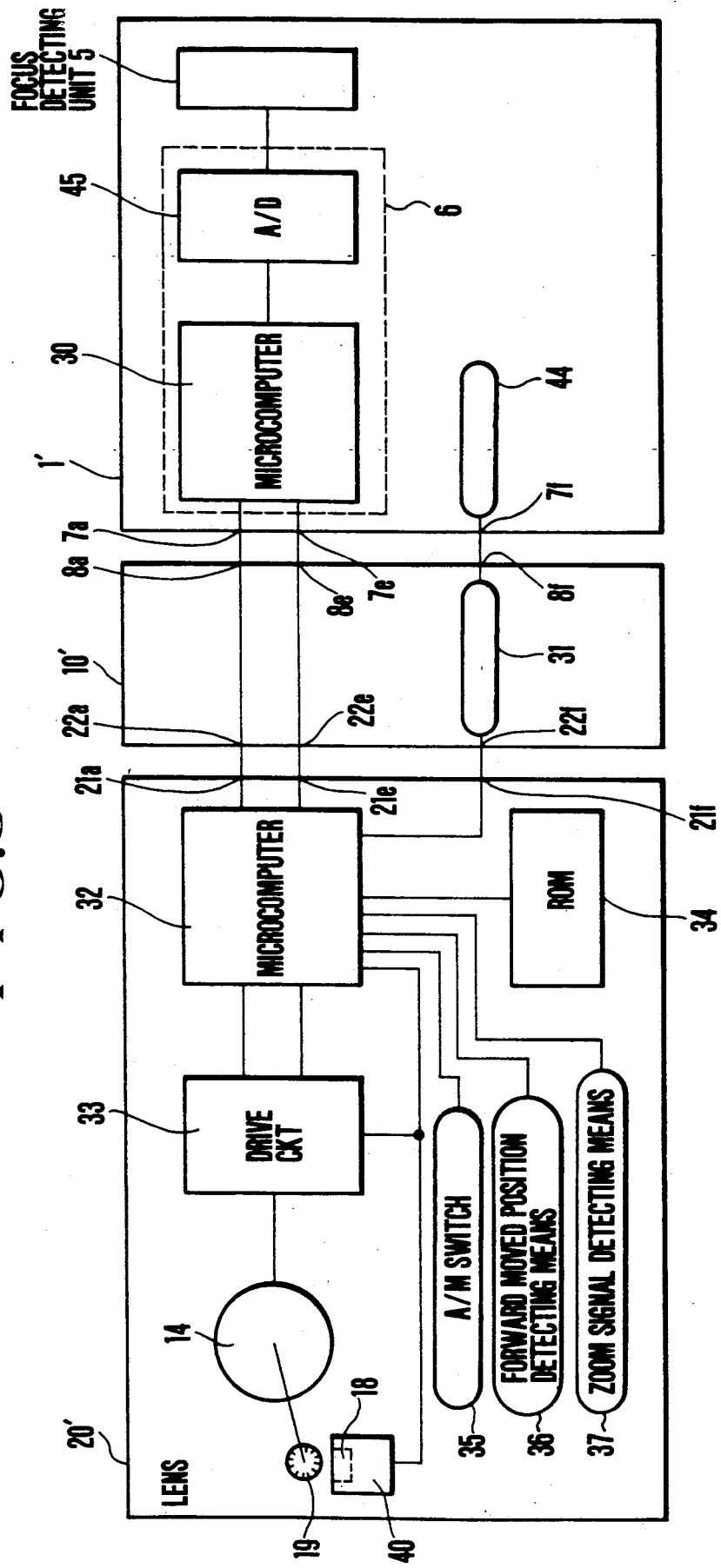
FIG. 3 is a block diagram of the electrical circuitry of a first embodiment of the automatic focusing device according to the invention.

FIG. 3 shows, in block form, the electrical circuit portions of FIG. 2. 1' is a circuit in the camera body 1; 10' is a circuit in the extender barrel 10; and 20' is a circuit in the photographic lens barrel 20. For in FIG. 2, the two pairs of an electrical contact pin and socket in a common channel are shown by 7 and 8, 21 and 22, however, the channel is actually six in number. So, in FIG. 3, the pins and sockets are discriminated by attaching subscriptions a to f to those numerals, but the channels b to d are omitted for the purpose of clarity.

The circuit 1' in the camera body 1 includes the focus detecting unit 5, an A/d converter 45 for converting its output to a digital signal, a microcomputer 30 for computing a defocus amount based on the output signal of the A/D converter 45, and means 44 for discriminating the detachment of the extender. A plurality of input-/output terminals of the microcomputer 30, an output terminal of the extender detachment discrimination means 44, and an electrical power line (not shown) are connected to the signal contact pins 7a to 7f. In the interior of the circuit 10' in the extender barrel 10, the signal contacts 8a–8e which are connected to the signal contact pins 7a–7e connected to the microcomputer 30 and the electrical power line are by-passed to the signal contact pins 22a–22e, and the signal contact 8f which is connected to the signal contact pin 7f connected to the extender detachment discrimination means 44 is not connected to the signal contact pin 22f of the extender barrel 10, being made open. Again, the signal contact pin 22f of the extender barrel 10 is connected to extender attachment discrimination means 31. Meanwhile, the circuit 20' in the lens barrel 20 comprises a microcomputer 32 for converting the output of the microcomputer 30 in the camera body 1 to a rotation pulse number of the diagrammatically depicted pulse plate 19 and a rotation direction to indicate a motor drive circuit 33 driving or stopping the motor. Circuit 20' also includes the drive circuit 33 for driving the ultrasonic motor 14 by the command of the microcomputer 32, the photo-reflector 18 for detecting the rotation of the pulse plate 19, and a rotation detecting circuit 40 comprising a wave shaping circuit for shaping the output signal of the photo-reflector zooming, and (4) to a ROM 34 in which the responsiveness information of the lens, the amount of forward movement of the lens per pulse, and the lens driving speed information are previously stored. The microcomputer 32 in the photographic lens is connected through the extender barrel 10 to the microcomputer 30 in the camera body, and also to the signal contact 21f connected to the signal contact pin 22f of the extender attachment discrimination means 31, and also to the ROM 34 and the motor drive circuit 33. Further, the microcomputer 32 in the photographic lens is connected to (1) an electric switch provided in changeover means 35 of the manual focus and the autofocus, (2) to focus portion forward moved position detecting means 36 such as an encoder for detecting the forward moved position of the focusing lens, (3), in the case when the photographic lens is a zoom lens, to zoom signal detecting means 37 for detecting information of the varying focal length by zooming, and (4) to rotation detecting circuit 40 for detecting a drive signal for moving the focusing portion forward from the pulse plate 19 rotating in synchronism with the motor 14 for driving the focusing lens.

In this embodiment, the attachment of the extender is discriminated by the microcomputer in the photographic lens barrel, but it is also possible to use the microcomputer in the camera body for that purpose.

Next, the auto-focus operation is described by reference to FIGS. 2 and 3.

Light entering the photographic lens Ln passes through the extending lens Lex, permeates the half-mirrored portion provided at a central portion of the quick return mirror 2, is reflected by the sub-mirror 3 supported on the quick return mirror 2 and impinges on the focus detecting unit 5 at the optically equivalent position to a film plane (not shown) of the camera body 1. The focus detection unit 5 produces a signal based on which the microcomputer 30 in the body 1 computes the direction of defocus and the defocus amount as an analog signal, the A/D converter 45 converts that signal to a digital signal which is sent to the microcomputer 30 in the body 1. Based on this signal, the microcomputer 30 in the body 1 determines whether o not the in-focus position lies within the range of focus detection depth. If it lies in the range, the defocus amount and the direction of defocus are computed. The information is sent through the signal contact pins 7a–7e, 22a–22e and the signal contacts 8a–8e, 21a–21e to the microcomputer 32 in the lens 20. Also, in the case when the microcomputer 30 in the body 1 determines that the in-focus position is beyond the distance measurable depth range of the focus detecting unit 5, a search action to be described later is to be carried out. For this purpose, the microcomputer 30 in the body 1 sends a prescribed signal to the microcomputer 32 in the lens 20.

At first, in the case when the in-focus position lies within the distance measurable range of the focus detecting unit 5, the microcomputer 32 in the lens receives the signal of the defocus amount and the direction of defocus sent from the microcomputer 30 in the body 1, and checks the situation in which the lens 20 is put. This computes information from the electrical switch in the auto-focus-manual focus changeover means 35 for discriminating the autofocus state and the manual focus state of the photographic lens. Microcomputer 30 also computes information from the focusing lens moved position detecting means 36 for detecting the forward moved position of the focusing lens, and the zoom signal detecting means 37 for detecting whether or not the photographic lens 20 is of the zoom type and what a value the focal length has. Microcomputer 30 also recognizes the state of the extend attachment discrimination means 31 connected to the signal contact 21f to detect whether or not the extender is attached. Microcomputer 30 also and further reads out from the ROM 34 the amount of forward movement of the lens per output pulse of the rotation detecting circuit 40, the responsiveness information of the lens, and the reset value of the constant speed control of the ultrasonic motor 14, thus obtaining information representing which direction the photographic lens must be moved to, and what number of pulses on the pulse plate 19 equals the required amount of its movement. Finally, microcomputer 30 transmits drive direction and the preset speed of the constant speed control to the drive circuit 33, and commands the drive to start.

Based on these commands and information, the drive circuit 33 causes the motor 14 to rotate in the predetermined direction at the predetermined speed. In FIG. 2, when the rotor 14b of the ultrasonic motor 14 rotates, the rotatable helicoid 16 on which the rotor 14 is fixedly mounted rotates, moving the focusing lens axially forward. When the rotatable helicoid 16 rotates, the pulse plate 19 fixedly mounted on the rotatable helicoid 16 also rotates, and the rotation detecting circuit 40 produces a pulse signal. Based on the frequency of this pulse signal, the drive circuit 33 controls the motor 14 to the determined speed. Also, when the output pulse signal of the rotation detecting circuit 40 becomes equal to the pulse number computed from the defocus amount, the microcomputer 32 in the lens commands the drive circuit 33 to stop the driving of the motor 14, and the drive circuit 33 stops the motor, thus ending the auto-focus operation.

Meanwhile, in the case when the microcomputer 30 in the body has judged that the in-focus position does not lie in the distance measurable range of the focus detecting unit 5, the microcomputer 30 in the body produces a prescribed signal. Upon receiving that signal, the microcomputer 32 in the lens, as has been described above, recognizes (1) the state of the lens, (2) reads out from the ROM 34 the preset speed of the constant speed control of the ultrasonic motor 14 and the previously set rotation direction in view of the case that the in-focus position is beyond the distance measuring range determined by the focus detecting unit 5, (3) transmits the drive speed and the preset speed of the constant speed control to the drive circuit 33, and (4) commands the drive start of the ultrasonic motor 14. In a prescribed time $t_1$ determined by the sum of the time necessary for the microcomputer 30 in the body to read the output signal of the A/D converter 45, the integration time of the photo-electric transducer element of the focus detecting unit 5 after the end of the distance measurement, and the time necessary to the communication between the microcomputer 30 in the body and the microcomputer 32 in the lens, the microcomputer 30 in the body performs the distance measurement again. At this time, the ultrasonic motor 14 continues rotating. If the in-focus position does not lie again in the distance measurement range of the focus detecting unit 5, the distance measurement is repeated. On the other hand, when the in-focus position has been detected, the information of the defocus amount is transmitted from the microcomputer 30 in the camera body to the microcomputer 32 in the lens. The microcomputer 32 in the lens compensates for the erroneous movement of the photographic lens Ln during the computing time of the microcomputer 30 in the body, the communication time with the microcomputer 30 and the drive circuit 33 in the body, and the time necessary for the microcomputer 32 in the lens to compute. Microcomputer 32 also calculates how many more pulses are necessary to drive the ultrasonic motor 14, and starts counting the pulses. When the rotation detecting circuit 40 produces an equal number of pulses to the computed number of pulses, the microcomputer 32 in the lens commands the drive circuit 33 to stop the ultrasonic motor 14. The drive circuit 33 stops the ultrasonic motor 14. Thus, the auto-focus operation ends.

Figure 4:
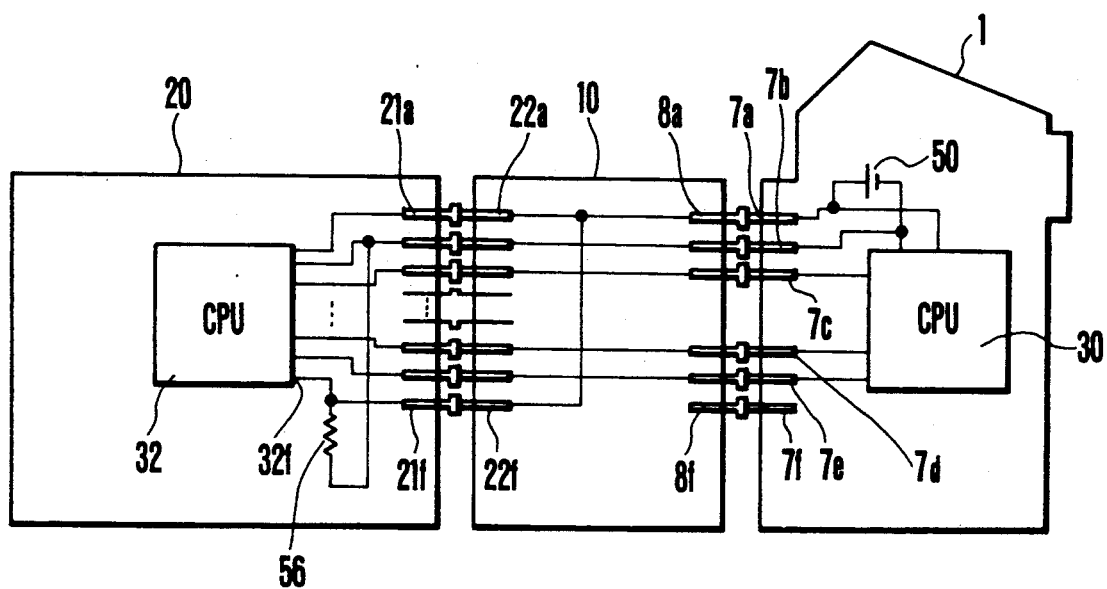
FIG. 4 is a schematic view of the means for discriminating between the attachment and detachment of the extender of the first embodiment.

Next, the extender attachment discrimination means 31 and the extender detachment discrimination means 44 of this embodiment for changing over the preset speed of the constant speed control of the ultrasonic motor 14 in the way described above are described by reference to FIG. 4.

The attachment and detachment discrimination means discriminate between the attachment and detachment of the extender of C times magnification or a case where the magnification of the extender has only one value. An extender discrimination terminal 32f of the microcomputer 32 in the lens is connected to one of the ends of a short-circuit preventing resistor 56, the other end of which is connected to the (−) terminal of the line of an electrical power source 50 in the lens barrel. Again, the extender discrimination terminal 32f is connected to the signal terminal 21f. The signal contact pin 22f which is connected to the signal contact 21f when the extender is attached is electrically connected to the (+) terminal of the electrical power source line in the extender barrel 10. The signal contact 7f which is connected to the signal contact 21f when the lens barrel 20 is directly coupled to the camera body 1 as the extender barrel 10 is not used is connected nowhere, being in the open state.

By the above-described structure, the extender discrimination terminal 32f of the microcomputer 32 in the lens becomes low level when the extender barrel 10 is not in use, and changes to high level when the extender barrel 10 is attached. In response to this, the microcomputer 32 discriminates between the presence and absence of the extender barrel 10 and changes over the preset speed of the constant speed control and the responsiveness information.

Figure 5:
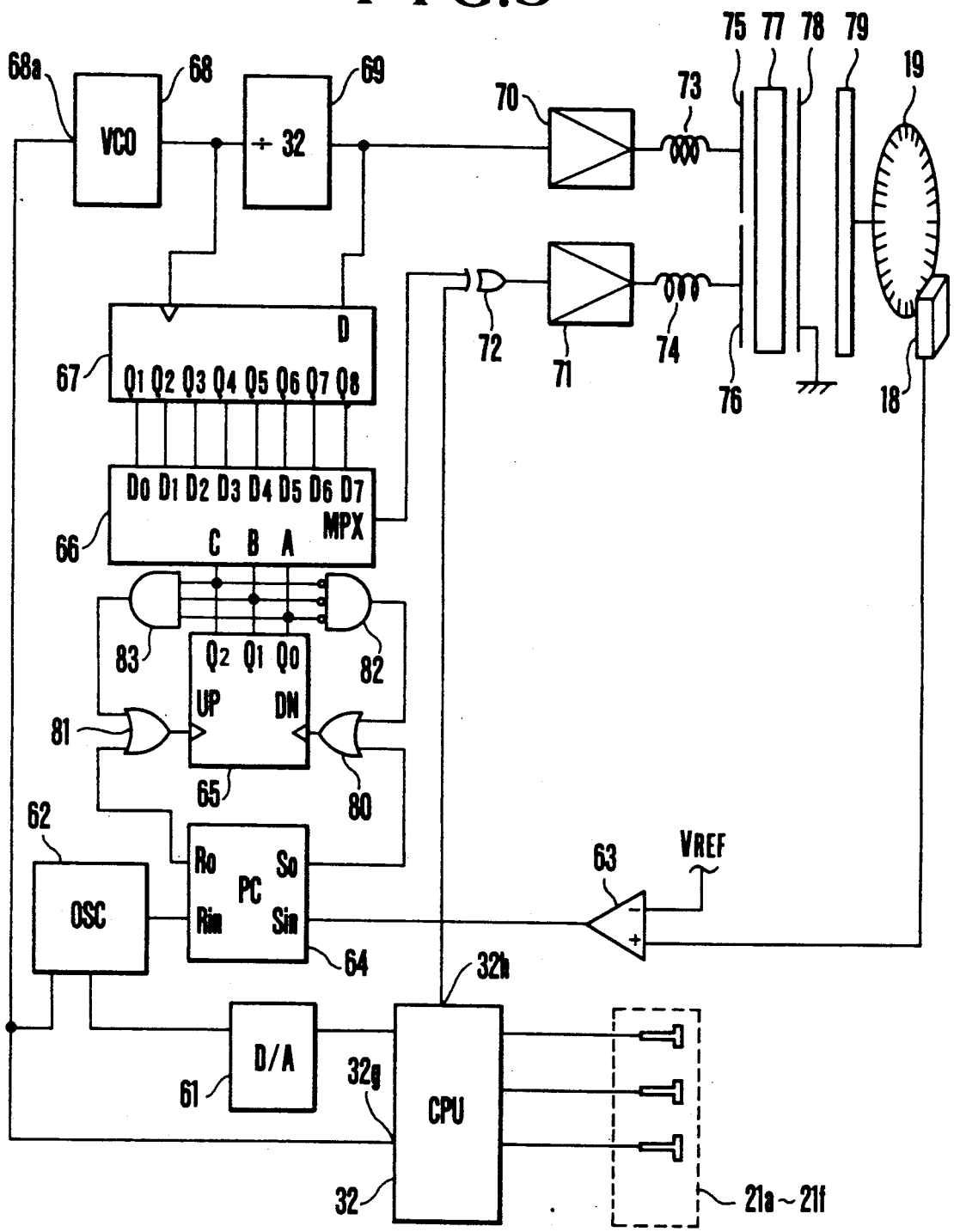
FIG. 5 is a block diagram of the constant speed control circuit in the first embodiment.

Subsequently, the constant control method is explained according to FIG. 5. The figure schematically shows the ultrasonic motor and illustrates the details of the drive circuit.

66 is a multiplexer receptive of outputs $Q_1-Q_8$ of a shift register 67 at its inputs $D_0-D_7$ and responsive to a code input signal at its control terminals A, B and C for selecting one of the inputs $D_0-D_7$ to send out that output of the register 67 which is applied to the selected input. The multiplexer 66 is so constructed that as the binary signal input to its terminals A, B and C increases, it unequivocally selects the output of a progressively lower stage of the register 67.

62 is a pulse oscillation circuit for setting the motor rotation speed and is so constructed that the frequency of its output pulse is changeable on the basis of the output voltage value obtained by converting the preset speed produced from the microcomputer 32 in the lens to an analog signal by a D/A converter 61.

77 is the stator of the ultrasonic motor. On the front surface of the stator are arranged two groups of electrostrictive elements treated for polarization. Drive electrodes 75 and 76 are arranged on the respective groups of electrostrictive elements to apply cyclic voltages of different phase by 90°. Also, 78 indicates a common electrode opposite to the electrodes 75 and 76. 73, 74 are coils; 70, 71 are amplifiers. 68 is an oscillation circuit (VCO) for driving the ultrasonic motor. Its oscillation frequency is set to 32 times the resonance frequency of the ultrasonic motor. 69 is a frequency dividing circuit for dividing the output of the oscillation circuit (VCO) 68 by 32. 72 is an exclusive OR circuit for selecting the rotation direction of the ultrasonic motor.

Also, 79 is a moving body comprising the rotor of the ultrasonic motor driven to rotate by the progressive vibrating wave generated in the stator of the ultrasonic motor and the rotatable helicoid, As the moving body rotates, the pulse plate 19 rotates. Reflection patterns are arrayed in prescribed intervals on the pulse plate 19. 18 is the photo-reflector including the light emitting light source and the photo-transistor for forming an output each time the reflection pattern passes in front of the photo-reflector 18 as the pulse plate 19 rotates, or a number of signals corresponding to the speed of rotation of the pulse plate 19. A comparator 63 converts the signal from the photo-reflector 18 to pulses. A phase comparator 64 has inputs Rin and Sin. When the rising signal is supplied to the input Rin earlier than to the input Sin as shown in FIG. 7, the phase comparator 64 changes and maintains its output $R_0$ to and at L for a phase difference period of those rising signals. Conversely when the rising signal supplied to the input Sin occurs earlier than that supplied to the input Rin, it changes and maintains its output $S_0$ to and at L for a phase difference period of those rising signals.

An up/down counter 65 is connected to the outputs $R_0$ and $S_0$ of the phase comparator 64 and operates in response to the falling signal at the inputs thereof.

An AND gate 83 has inputs connected to the outputs $Q_0$-$Q_2$ of the counter 65. 82 is an inverted input AND gate.

Since the frequency of oscillation of the oscillation circuit 68 is 32 times as high as the frequency of resonance of the ultrasonic motor, when the oscillation circuit 68 starts to oscillate, because its output (FIG. 6($a$)) transmits to the frequency dividing circuit 69, pulses of the divided-by-32 frequency are applied as the output of the frequency dividing circuit 69 to the amplifier 70 (FIG. 6($b$)). These pulses become a sine wave by a resonance circuit comprising the coil 73 and the electrode 75. As a result, the sine wave of the same period and same phase as those of the output pulses of the frequency dividing circuit 69 is applied to the electrode 75.

Meanwhile, since the output of the frequency dividing circuit 69 transmits to the D input terminal of the shift register 67, and the output pulses of the VCO 68 are applied as the shift clock of the register 67, the outputs $Q_1$-$Q_8$ of the shift register 67 become pulses successively delayed by one output pulse of the VCO from the output of the frequency dividing circuit 69 as shown in FIGS. 6($c$) to 6($j$). Since, as has been described above, the frequency dividing circuit 69 has a factor of 32 relative to the VCO output, each of the outputs of the register 67 delays 360°/32 = 11.25° from the output of the preceding stage. Therefore, from the output $Q_8$, the output of the frequency dividing circuit output also becomes a pulse delayed by $11.25 \times 8 = 90°$ relative to FIG. 6($b$).

Now, when the multiplexer 66 is set so as to produce an output D7, then the pulse of the output $Q_8$ of the register 67 is applied as the sine wave through the amplifier 71 and coil 74 to the electrode 76. Therefore, in this state, the cyclic voltages of different phase by 90° are applied to the electrodes 75 and 76.

Also, when the terminal of the exclusive OR circuit 72 connected to the microcomputer 32 in the photographic lens is H, the voltage applied to the electrode 76 is delayed in phase to the voltage applied to the electrode 75. Conversely when the terminal is L, the phase advances. Thus, the direction of rotation of the ultrasonic motor is changed.

Meanwhile, the ultrasonic motor has its electric-rotation conversion efficiency at the maximum when the phase angle between the voltages applied to the first and second groups of electrostrictive elements is 90°. The narrower the phase angle, the lower the efficiency. When 0°, the efficiency is, zero. That is the ultrasonic motor stops.

Therefore, when the multiplexer 66 is set so as to produce D7 as has been described above, the ultrasonic motor rotates at the maximum efficiency. As the multiplexer 66 is selectively set so as to produce outputs $D_6$, $D_5$, $D_4$, $D_3$, $D_2$, $D_1$, $D_0$, the rotation efficiency becomes progressively lower, so that the speed of rotation of the ultrasonic motor decreases. Because the construction is as such, when the multiplexer is caused to select $D_7$-$D_0$, the speed of rotation of the ultrasonic motor becomes slower in this order.

Next, the constant speed operation is described.

The microcomputer 32 in the lens, when receiving the auto-focus drive command described above from the microcomputer 30 in the body through the signal contacts 21$a$-21$f$, performs computation and, after that, upon consideration of the attachment or detachment of the extender, transmits a prescribed digital signal for determining the speed of the constant speed control to the D/A converter 61. The D/A converter 61 converts the digital signal to an analog signal which is applied to the oscillator 62 for setting the speed whose frequency of oscillation changes by the input from the D/A converter 61. At the same time as this, the terminal 32$g$ of the microcomputer in the lens changes from L to H (H to L). So, the oscillator 62 for setting the speed and the oscillator 68 for driving the ultrasonic motor start to oscillate, and the motor starts to rotate as has been described above.

Since the rotation direction selecting terminal 32$h$ takes H or L level to set the direction of rotation of the motor before the two oscillators 62 and 68 start to oscillate, and also since the rotor of the ultrasonic motor is fixedly mounted directly to the rotatable helicoid of the lens barrel in such a manner that a set circuit (not shown) produces a signal for causing the multiplexer 66 to produce a signal at the output D7 or a signal representing the phase difference of 90° between the input pulses of the amplifiers 70 and 71, the photographic lens also starts to be moved forward along with the start of rotation of the ultrasonic motor. The pulse plate 19 fixedly mounted directly to the rotatable helicoid also rotates likewise. Its rotation is detected by the photo-reflector 18. Through the comparator 63, pulses of the frequency corresponding to the speed of rotation are transmitted to the input Sin of the comparator 64. Meanwhile, the preset speed value is set in the D/A converter 61, and the pulses of the frequency corresponding to the preset value are sent from the pulse oscillation circuit 62, entering the input Rin of the comparator 64. In such a manner, the speed of rotation of the ultrasonic motor is accelerated to the preset value. Then the constant speed control takes action.

If the speed of rotation of the ultrasonic motor is lower than the preset value, then because the frequency of the pulses from the pulse oscillation circuit is lower than the frequency of the pulses from the comparator 63, the pulses to the input Rin of the comparator 64 are larger in number than to the input Sin. As a result, the comparator 64 produces L at the output $R_0$, causing the counter 65 to count up the pulses. As a result, the multiplexer 66 selects the pulse from the output terminal of the next stage of the register 67 to be applied to the amplifier 71. Therefore, the speed of rotation of the ultrasonic motor is increased. In the process of increasing the speed of rotation of the ultrasonic motor in such a way, when the frequency of the pulses from the reflector 18 coincides with the frequency of the pulses from the pulse oscillation circuit 62, the phases of the pulses to the inputs Rin and Sin of the comparator 64 coincide with each other. Therefore, the outputs $R_0$ and $S_0$ of the comparator 64 become open, holding the counter 65 in its set state. The pulses from that output terminal of the register 67 which is selected at that time continue being applied to the amplifier 71. Thus, the rotation of the ultrasonic motor is controlled to the preset value by the D/A converter 61.

Also, conversely when the speed of rotation of the ultrasonic motor is faster than the preset value, the comparator 64 produces L at the output S, causing the counter 65 to count down. Therefore, the output terminal of the previous stage of the register 67 is selected to decrease the speed of rotation of the ultrasonic motor. When its speed coincides with the preset value, the counter 65 is stopped from counting down. After that, the rotation is controlled in that state.

By the foregoing features, the microcomputer in the photographic lens detects whether the extender is present or absent, and corrects the speed of forward or rearward movement of the entirety or the focusing portion of the photographic lens on the basis of that information so that the speed of movement of the image plane on the focus detecting unit becomes almost constant regardless of whether the extender is in use or out of use. Hence it becomes possible to perform focus detection always at good efficiency.

Although the foregoing embodiment has been described as using the ultrasonic motor as the drive power source for the lens, an electromagnetic motor or other known drive source may be used. In the case of the electromagnetic motor, the ordinary PWM (pulse width modulation) method or voltage control method may be employed to perform constant speed control. Also, the driving power source is not limited to the built-in-barrel type. Another type in which the motor is built in the camera body and its driving power is transmitted through a driving power transmitting function may be adopted.

Figure 8:
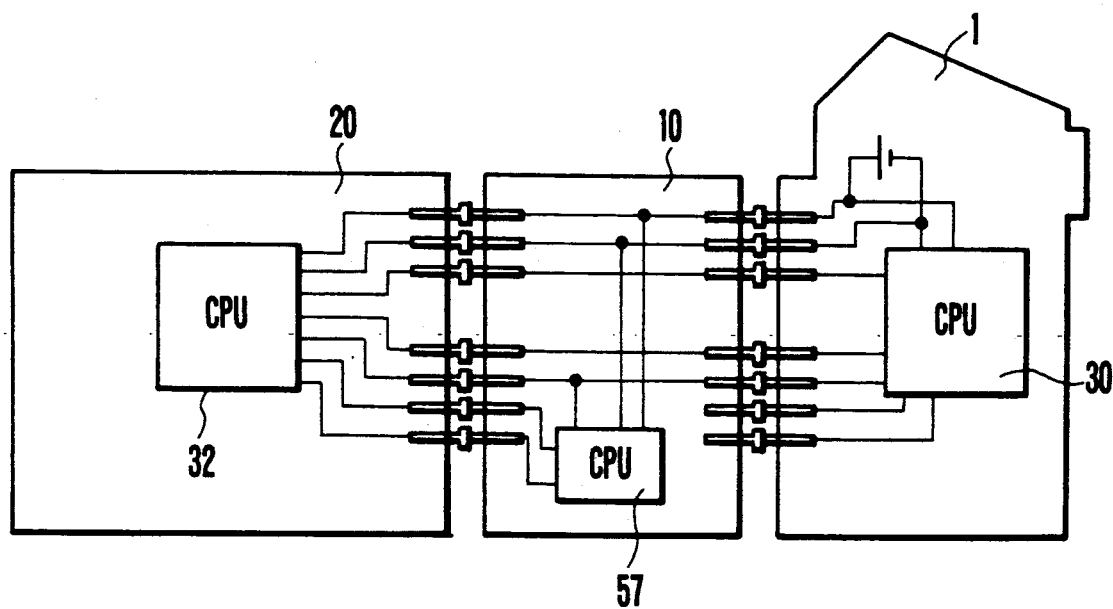
FIG. 8 is a schematic view of another example of the means for discriminating between the attachment and detachment of the extender.

On the other hand, in the detection of the use or non-use of the extender or like attachment optical system, the discrimination terminal of the microcomputer in the photographic lens is made to become H or L. Yet, as shown in FIG. 8, another microcomputer 57 may be solely used in the extender barrel 10. It is from this microcomputer 57 that the information of the use of the extender is supplied to the microcomputer 32 in the photographic lens. In such a manner, the discrimination of the use or non-use of the extender may be made by the microcomputer 32 in the photographic lens. Since, in the arrangement of FIG. 4, the only recognition is the use of the extender, the extender usable with the photographic lens is limited to only one specific magnification. Therefore, there is no hope to discriminate between the use and non-use of another extender or reducer of different magnification. With this feature, despite an arbitrarily chosen extender, it becomes possible to perform the focus adjustment of the photographic lens at the optimum speed. Also, instead of using the microcomputer, a memory circuit such as ROM storing the necessary data may be used. Even in this case, its function can sufficiently be fulfilled. If the attachment optical systems to be used with the photographic lens have one and the same specification, a mechanical detecting method may be employed such that a projection is provided on a confronting one of the coupling parts of the attachment barrel to the photographic lens barrel, and this is detected by a microswitch.

Figure 9A:
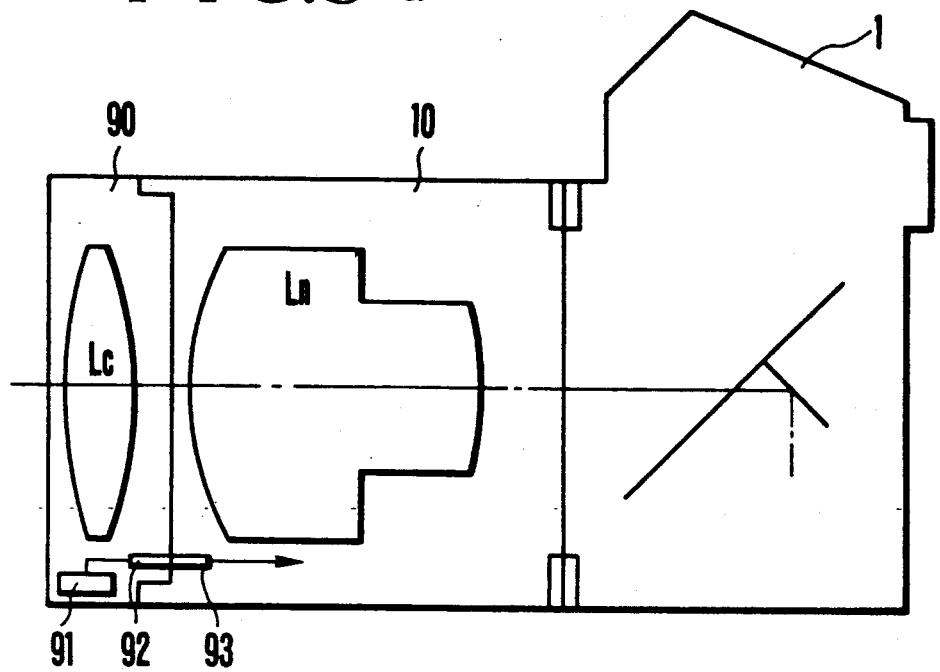
FIG. 9(a) is a schematic longitudinal section view of another embodiment of the invention.
Figure 9B:
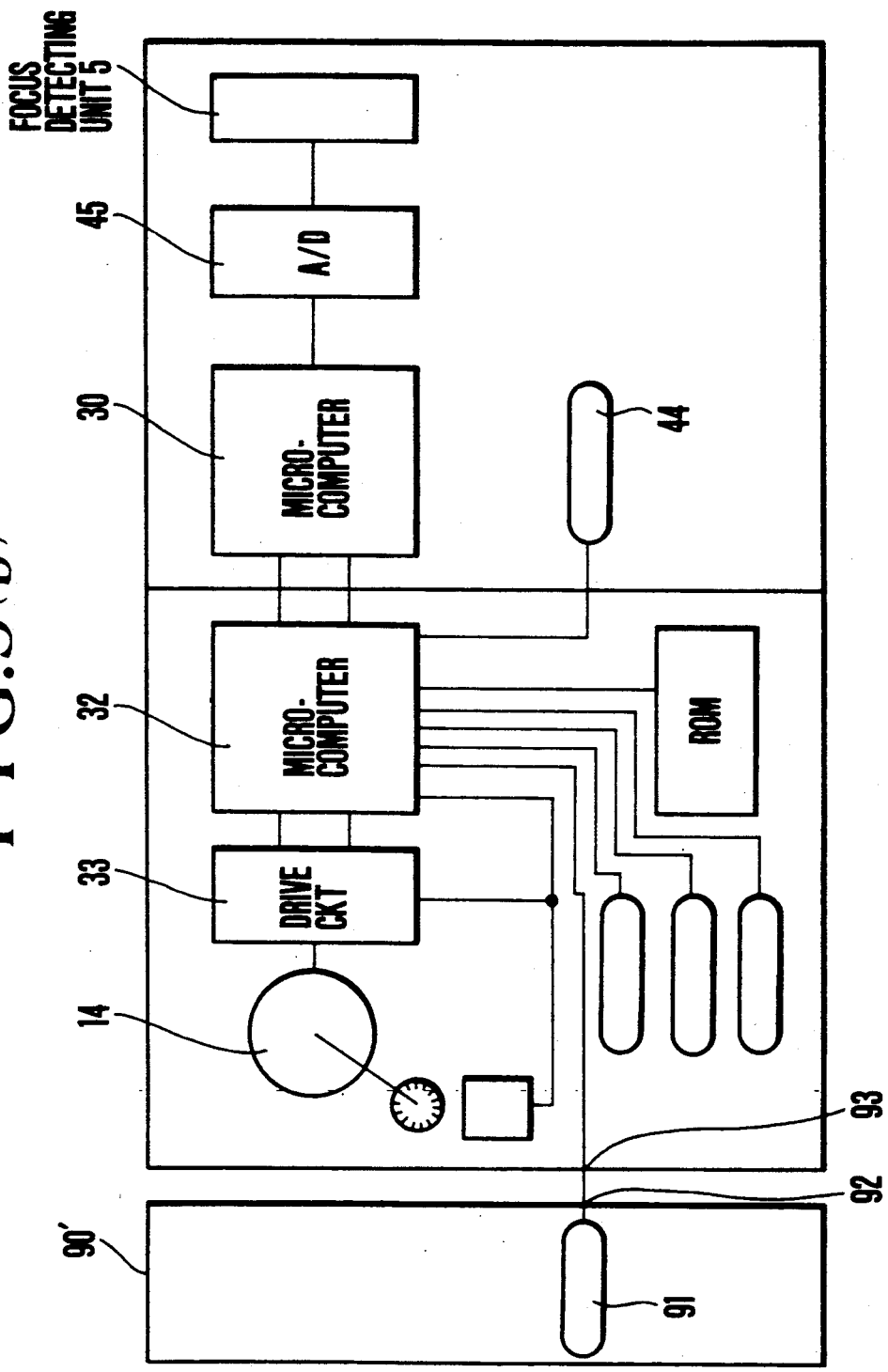
FIG. 9(b) is a block diagram of the circuitry of the camera of FIG. 9(a).

Though the foregoing embodiments have been described in connection with the barrel of the extender or reducer attached in between the interchangeable lens and the camera body, it may be of the type of attaching to the front of the interchangeable lens as shown in FIGS. 9(a) and 9(b). Also, in this example, the attachment optical system is a closeup lens Lc. The closeup lens Lc has no aim to change the focal length of the photographic lens. But, its use actually changes the focal length. So it is preferred to correct the speed of focus adjustment. A barrel 90 containing the closeup lens Lc is releasably attached to the front end of the photographic lens barrel 10. A memory device 91 such as a ROM stores the information corresponding to the required value of the correction factor for the optimum speed of focus adjustment despite the fact that the closeup lens Lc is attached to the photographic lens to change its focal length. An electric contact pin 92, when inserted into an electric contact socket 93 of the photographic lens barrel 10, transmits the information of the memory device 91 to the microcomputer 32 in the photographic lens. The microcomputer 32, as has been described above, recognizes the presently set position (degree of focus adjustment) of the photographic lens, if the photographic lens is a zoom lens, its focal length, and the use of the closeup lens Lc to determine the speed of focus adjustment and controls the drive circuit 33 to drive the motor.

Figure 10:
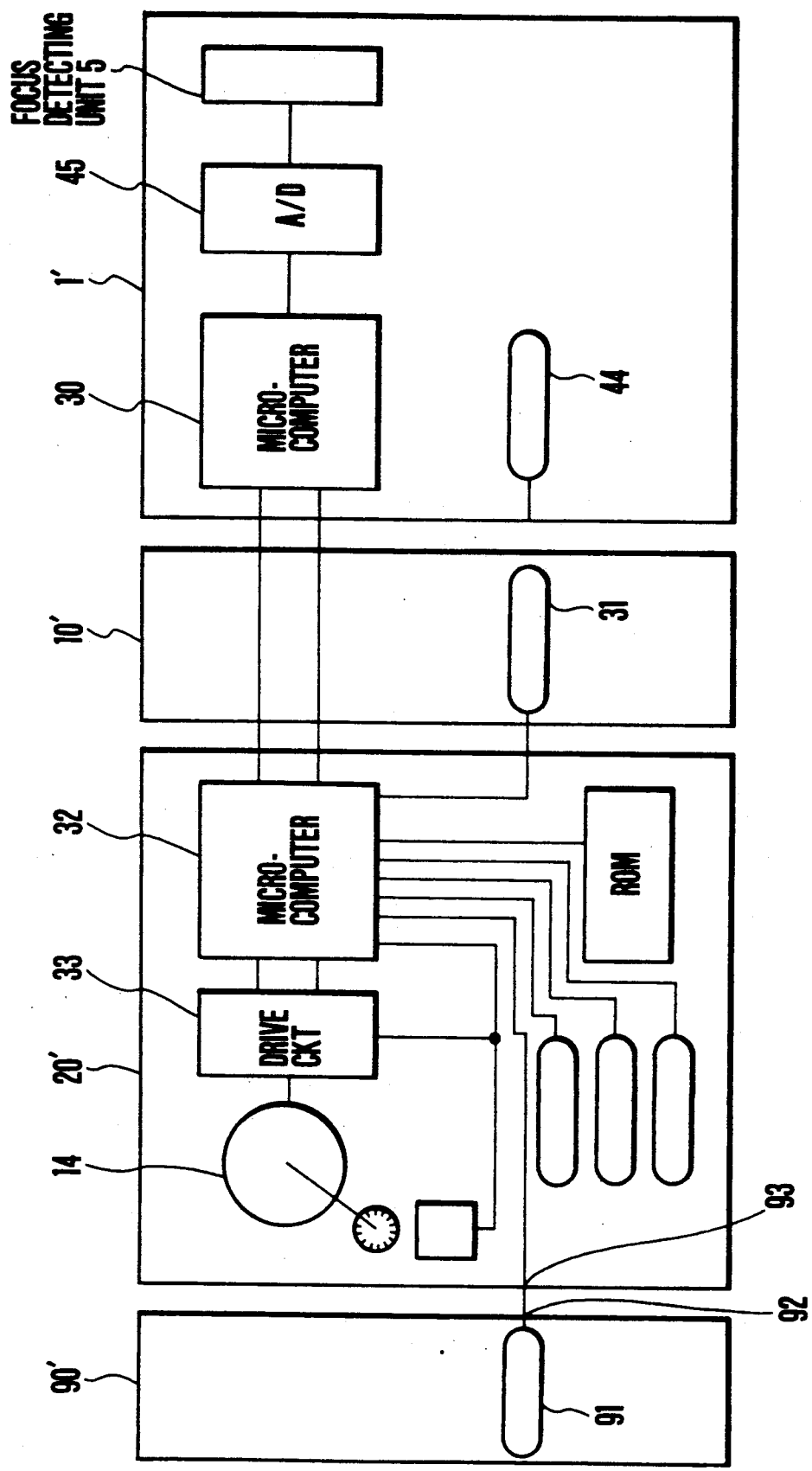
FIG. 10 is a block diagram of the electrical circuitry of still embodiment of the invention.

FIG. 10 shows, in block form, the electrical circuitry of the camera attached with a reducer for enlarging the image angle between the photographic lens and the camera body and further with a closeup lens at the front of the photographic lens. 1' is an electrical circuit in the camera body; 10' is an electrical circuit in the reducer; 20' is an electrical circuit in the photographic lens; and 90' is an electrical circuit in the close up lens barrel. During the sequence of auto-focus operations described above, the microcomputer 32 in the photographic lens discriminates the use or disuse of the reducer, and the moved position of the focusing lens, and further discriminates the attachment of an accessory at the front end of the photographic lens to determine the speed of focus adjustment in a way similar to that described above.

Figure 11A:
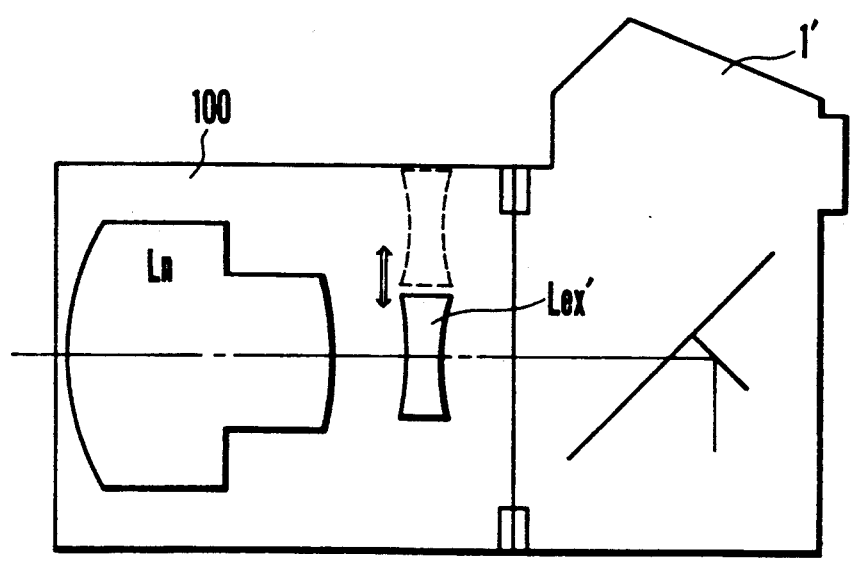
FIG. 11(a) is a schematic longitudinal section view of a further embodiment of the invention.
Figure 11B:
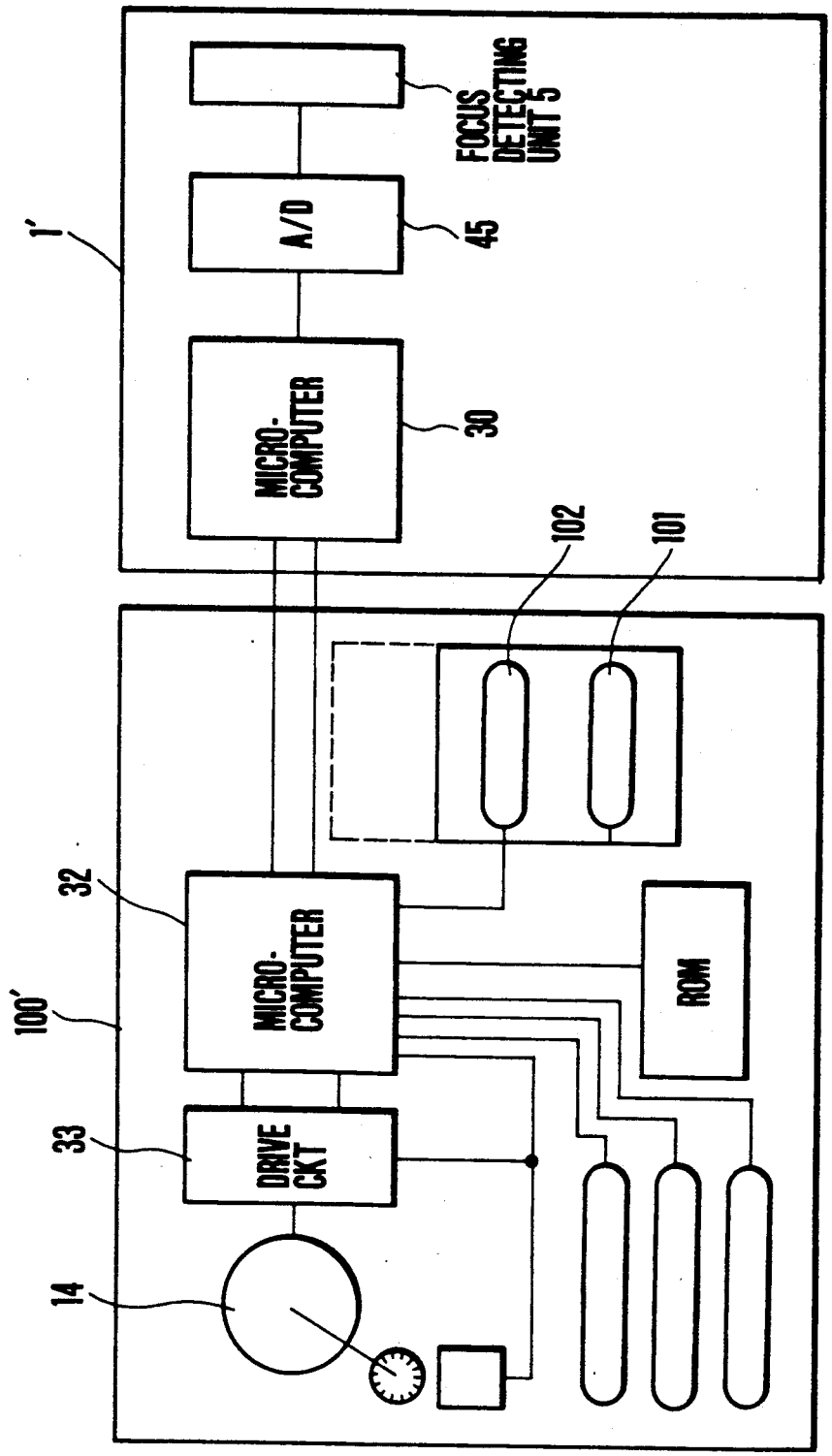
FIG. 11(b) is a block diagram of the electrical circuitry of the camera of FIG. 11(a).

FIG. 11(a) shows an example of an extender-built-in type interchangeable lens 100 attached to the camera body 1. In this lens, the extender Lex' is arranged to move between a photographic optical path (shown by the solid line) and a position (shown by dashed lines) out of the optical path by a changeover operation from the outside of the barrel. FIG. 11(b) is a block diagram of an electrical system where when the extender Lex' is in alignment with the optical axis, attachment discrimination means 101 or detachment discrimination means 102 connects with the microcomputer 32 to transmit information. By a similar procedure to that described above, the microcomputer 32 determines the speed of focus adjustment.

Figure 12A:
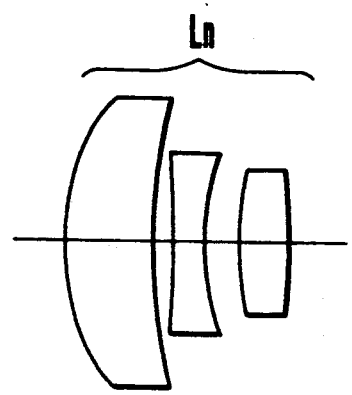
FIGS. 12(a) and 12(b) are longitudinal section views of an objective lens without and with an extender lens, respectively.
Figure 12B:
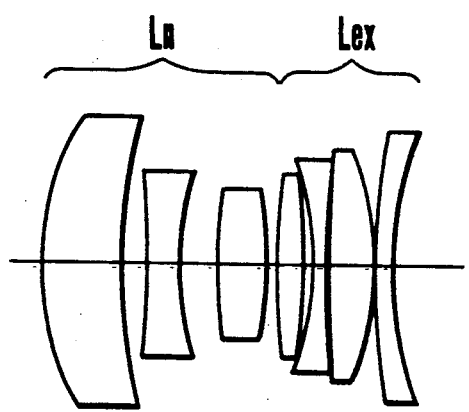
Figure 13A:
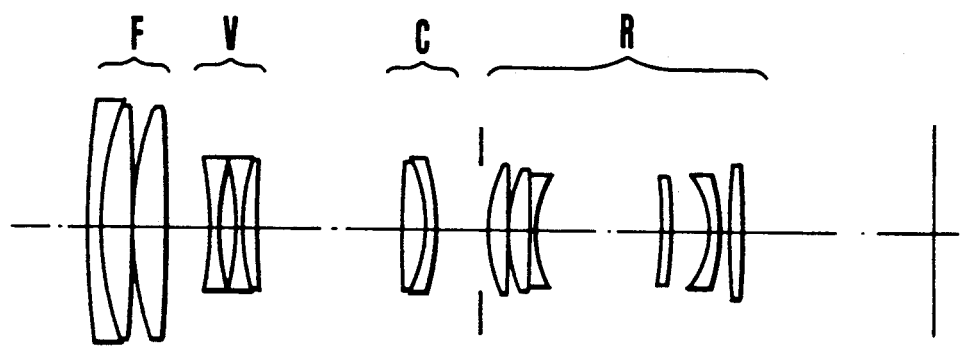
FIGS. 13(a) and 13(b) are longitudinal section views of an objective lens without and with a closeup lens, respectively.

FIG. 12(a) in optical section shows an example of the photographic lens, and FIG. 12(b) shows how the extender Lex is attached. FIG. 13(a) in optical section shows a case where the photographic lens is a zoom lens. In the figure, F is a focusing lens group, V is a variation lens group, C is a compensation lens group, and R is a relay lens group.

Figure 13B:
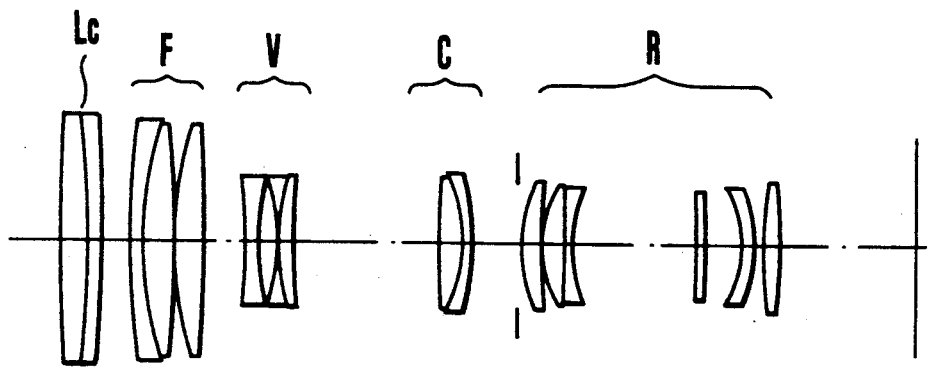

FIG. 13(b) depicts how a closeup lens Lc is attached to the front of the focusing lens group F.

According to the invention described above, in view of the provision for the use of an attachment optical system, the speed of focus adjustment of the lens is previously set slow, thereby eliminating the drawback that when used as usual, the management becomes worse. Thus an advantage is produced that sharp focus is reached at the maximum possible speed regardless of whether the attachment is in or out of use.

Another advantage is that, because constant speed control is carried out, even when stopping the lens, the error of the stopped position of the lens can be extremely minimized.

What is claimed is:

1. An automatic focus adjustment device comprising:
    an objective optical system;
    focus detecting means for repeatedly detecting a focus state of said objective optical system by using light passing through said objective optical system;
    optical means for changing the focal length of said objective optical system;
    attachment detecting means for detecting whether or not said optical means has been inserted in the optical path of said objective optical system;
    focusing means for performing focusing of a composite system having said optical system and said optical means;
    a driving source motor for driving said focusing means; and
    means for discriminating the attachment of said optical means on the basis of an output of said attachment detecting means, and for changing a motor speed of said driving source motor depending on a property of said optical means in accordance with the focus state detected by said focus detecting means for compensating for a change in the movement rate of the image plane caused by the attachment of said optical means.

2. A device according to claim 1, wherein said optical means is a conversion lens.

3. A device according to claim 2, wherein said conversion lens is an extender.

4. A device according to claim 2, wherein said conversion lens is a reducer.

5. A device according to claim 2, wherein said optical means is attached in between said objective optical system and said focus detecting means.

6. A device according to claim 1, wherein said optical means is a closeup lens.

7. A device according to claim 6, wherein said optical means is attached to the object side of said objective optical system.

8. A camera system comprising:
    a camera body;
    a photographic lens releasably attached to said camera body;
    focus detecting means provided in said camera body to repeatedly detect a focus state of said photographic lens;
    a conversion lens releasably attached in between said photographic lens and said camera body;
    detecting means for detecting the attachment of said conversion lens;
    focusing means for performing focusing of said photographic lens or a composite system of said photographic lens and said conversion lens;
    said photographic lens having a driving source motor for driving said focusing means; and
    means electrically connected to said detecting means and responsive to attachment of said conversion lens for changing a motor speed of said driving source motor in accordance with an optical value of said photographic lens for compensating for a change in the movement rate of the image plane caused by the attachment of said optical means.

9. A camera system according to claim 8, wherein said conversion lens is an extender.

10. A camera system according to claim 8, wherein said conversion lens is a reducer.

* * * * *

UNITED STATES PATENT AND TRADEMARK OFFICE
CERTIFICATE OF CORRECTION

PATENT NO. : 5,053,798

DATED : October 1, 1991

INVENTOR(S) : TSUNEMASA OHARA, ET AL.

It is certified that error appears in the above-identified patent and that said Letters Patent is hereby corrected as shown below:

COLUMN 1

Line 20, "to" should be deleted.

COLUMN 2

Line 53, "a" should be deleted.

COLUMN 3

Line 2, "phase circuit." should read --phase comparator circuit.--.
    Line 11, "still embodiment" should read --still another embodiment--.
    Line 28, "with" should read --to--.
    Line 44, "overlay" should read --overlap--.
    Line 67, delete "to deteriorate".

COLUMN 4

Line 66, "built-into" should read --built-in to--.

UNITED STATES PATENT AND TRADEMARK OFFICE
CERTIFICATE OF CORRECTION

PATENT NO. : 5,053,798         Page 2 of 3
DATED      : October 1, 1991
INVENTOR(S): TSUNEMASA OHARA, ET AL.

It is certified that error appears in the above-identified patent and that said Letters Patent is hereby corrected as shown below:

COLUMN 5

Line 26, "For in" should read --In--.
    Line 29, "channel is" should read --channels are--.
    Line 34, "A/d convertor 45" should read --A/D convertor 45--.
    Line 65, "zooming, and (4) to" should read --18 and--.

COLUMN 6

Line 10, "to" should read --a--.
    Line 13, "to" should read --a--.
    Line 15, "to" should read --a--.
    Line 39, "o" should read --or--.
    Line 67, "a" should be deleted.

COLUMN 7

Line 1, "extend" should read --extender--.
    Line 4, "and" should be deleted.
    Line 40, "recognizes (1)" should read --(1) recognizes--.

COLUMN 9

Line 14, "helicoid," should read --helicoid.--

UNITED STATES PATENT AND TRADEMARK OFFICE
CERTIFICATE OF CORRECTION

PATENT NO. : 5,053,798

DATED : October 1, 1991

INVENTOR(S) : TSUNEMASA OHARA, ET AL.

It is certified that error appears in the above-identified patent and that said Letters Patent is hereby corrected as shown below:

COLUMN 12

Line 57, "disuse" should read --non use--.

Signed and Sealed this

Fifteenth Day of June, 1993

Attest:

MICHAEL K. KIRK

Attesting Officer    Acting Commissioner of Patents and Trademarks